May 11, 1954
F. S. DENNEEN
2,678,370
METHOD AND MEANS FOR BUTT WELDING
LARGE METALLIC SURFACES
Filed Feb. 28, 1950
2 Sheets-Sheet 1
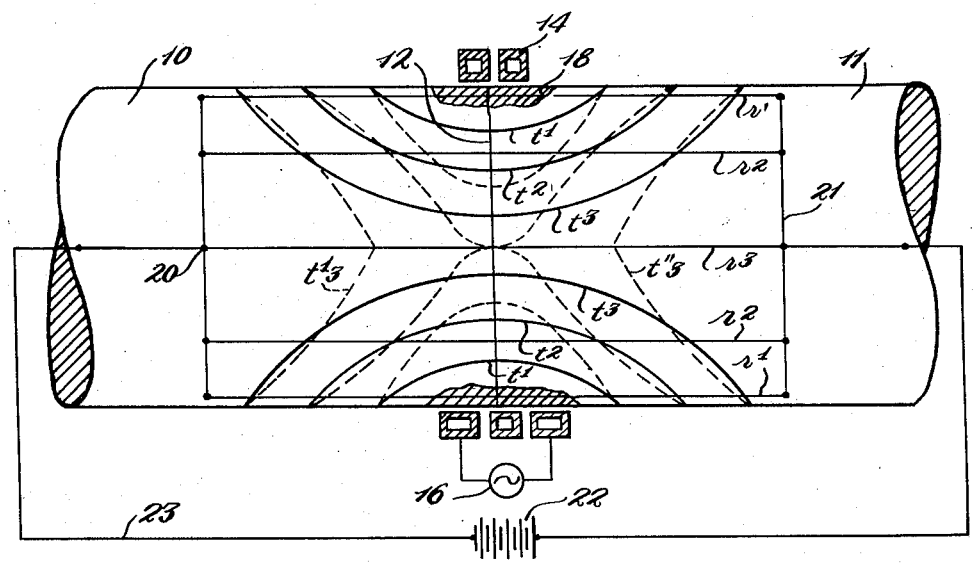
FIG. 1
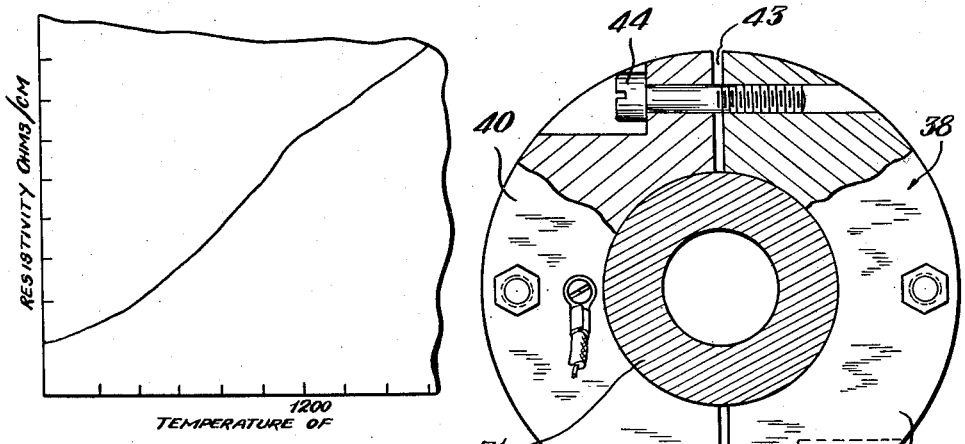
FIG. 2
FIG. 4
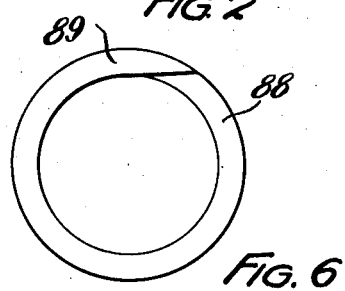
FIG. 6
INVENTOR.
FRANCIS S. DENNEEN
BY
Alfred C. Body
ATTORNEY May 11, 1954

F. S. DENNEEN 2,678,370

METHOD AND MEANS FOR BUTT WELDING
LARGE METALLIC SURFACES

Filed Feb. 28, 1950

INVENTOR.
BY FRANCIS S. DENNEEN

ATTORNEY

Patented May 11, 1954

2,678,370

UNITED STATES PATENT OFFICE 2,678,370

METHOD AND MEANS FOR BUTT WELDING LARGE METALLIC SURFACES

Francis S. Denneen, Cleveland, Ohio, assignor to The Ohio Crankshaft Company, Cleveland, Ohio, a corporation of Ohio Application February 28, 1950, Serial No. 146,828

9 Claims. (Cl. 219—10)

This invention pertains to the art of pressure welding and, more particularly, to a means and method for heating surfaces of large metallic members to an even and uniform welding temperature.

Heretofore, in the art of pressure butt welding surfaces of large metallic members, one of the principal problems has been to evenly and uniformly raise the temperature of the entire surfaces to be welded to the welding point such that an even and uniform-strength weld will result.

In the copending application of W. C. Dunn, Serial No. 615,331 and assigned to the assignee of this application, it was proposed to slightly space the surfaces to be welded and position a flat or disc-like, high-frequency inductor therebetween, heating the surfaces to the welding temperature, quickly removing the inductor and moving the surfaces into a pressure engagement such that the heated metal of the two surfaces would unite in a homogeneous mass. One of the difficulties with such a method is that the surfaces were exposed to the oxygen of the atmosphere and oxidation of the metal occurred to the point wherein a successful weld became somewhat difficult. Scale inclusions were present in the weld. Also, at the high temperatures employed, the carbon in the steel disassociated and deposited on the inductor. A thin line of decarburized metal could be seen at the exact junction of the weld. To overcome this oxidation and decarburization, the heating was carried out in a controlled atmosphere of a nature such that the metal was neither carburized nor decarburized and no oxidation occurred. Controlling the atmosphere is critical and difficult in large-scale production.

To eliminate the need for controlled atmospheres, it has been proposed to hold the surfaces in firm, pressure, air-excluding contact before applying the heat. With such an arrangement, resistance welding could be employed. However, with large members of a type to which this invention pertains, the electric currents required to produce the necessary heat are extremely high. Electric sparking and other arcing action occur with resultant pitting of the surfaces and loss of metal from the weld. Making an electrical contact from the power source to the parts to be welded also presents difficulties.

Induction heating or other types of heat, such as flame heating, wherein the heat is applied to the members in or to the exterior surfaces adjacent to the abutting surfaces has also been employed. This type of welding may be referred to as conduction welding, as the heat must flow by thermal conduction from the exterior surfaces of the members to the interior portions of the surfaces to be welded. With large members, obtaining an even heating across the surfaces to be welded has been almost a complete impossibility. The heat flows in all directions inwardly and longitudinally of the members. However, the longitudinal heat flow in the members is so great as to render the heating of the central portion of the surfaces extremely difficult. Either an undue amount of time to complete the weld must be utilized or unduly long longitudinal lengths of the members must be heated. In some instances, it has been found that the external surfaces of the members adjacent to the abutting surfaces can be heated to above the melting temperature without heating the interior portions fully. The portions of the abutting surfaces remote from the source of heat; that is, the center, still remain at a temperature well below the welding or fusion temperature. A poor weld naturally results.

The present invention overcomes the above difficulties and heats the surfaces more uniformly than has heretofore been thought possible and it enables a firm, homogeneous, flawless weld to be obtained.

An object of the present invention is to provide new and improved methods and apparatus for pressure butt welding of large surface areas of large metallic members which heats the surfaces to be welded more rapidly and more uniformly than has ever heretofore been thought possible.

Another object is to provide new and improved means and apparatus which enables portions of the surfaces remote from the primary external source of heat to be raised quickly and rapidly to the welding temperature.

Another object is to combine the advantages of conduction heating with electrical-resistance type heating without the disadvantages of either.

Another object is to utilize variations in the electrical resistivity of the metal being heated to automatically compensate for the differences in temperature across the surfaces being heated and welded.

Still another object of the invention is to obtain with large members a secondary internal heating remote from the primary source of heat.

Another object is the provision of the method of making butt welds wherein electric currents flow in the members being welded, both parallel to and transverse to the surfaces being welded.

Another object of the invention is to utilize, in combination with conduction heating of members to be welded, a supplementary resistance-type heating at points remote from the source of the conduction-type heat.

Another object is to utilize a high heat-resistant, electrically-conductive member disposed between the members and inwardly of the surfaces which can be heated by flowing electrical currents therethrough and which is so disposed relative to the members that the surfaces can be brought into pressure-welding engagement without interference of the conductive member.

Still another object is the method of butt welding members comprising bringing the surfaces to be welded into pressure engagement, heating the members exteriorly in the vicinity of the surfaces by radiant or induction heat, and heating the member interiorly by passing electric currents across the surfaces, the heating from the latter taking place primarily interiorly of the members due to the variation in resistivity of the members across the surface as a result of temperature variations from the exterior generated heat.

Another object of the invention is to produce improved butt welds by agitating the surfaces being welded while in the plastic state at a relatively high frequency.

Generally speaking, the invention comprises heating the members exteriorly in the vicinity of the surfaces to be welded by means of radiant or induction heat and passing an electric current longitudinally of the members to provide an electric resistance-type heating interiorly of the members and primarily in the vicinity of the surfaces.

In one embodiment, the surfaces are held in engagement and the electrical currents are generally passed through the surfaces, the heating taking place interiorly of the members due to a variation in resistivity of the members both in the plane of and transverse to the surfaces because of temperature variations resulting from the use of the external source of heat.

In another embodiment of the invention, the surfaces are slightly spaced and the electrical currents are passed through an electrical resistance-heating element disposed interiorly of and electrically connecting the members and so arranged that the surfaces to be welded can be brought into subsequent pressure-welding engagement without interference from the resistance element.

As another feature of the invention, provision is made for slightly agitating the heated metal of the surfaces when in the welding position either longitudinally, transversely or both of the surfaces, the rate and degree of agitation being such as to primarily affect or knead the heated molecules without substantially displacing the surfaces.

The invention comprises certain methods and steps, and parts and arrangement of parts, preferred embodiments of which are described in this specification and illustrated in the attached drawing which is made a part hereof, and wherein:

Figure 1 is a cross-sectional view of a pair of metallic members with surfaces in abutting relationship in the process of being heated for the purposes of welding the surfaces using methods and apparatus embodying the present invention.

Figure 2 is a curve showing the variation of resistivity of SAE 1045 steel plotted against the temperature of the metal.

Figure 4 is a cross-sectional view of Figure 3 approximately on the line 4—4 thereof.

Figure 6 is a side-elevational view showing in detail one of the parts of Figure 5.

Figure 3:
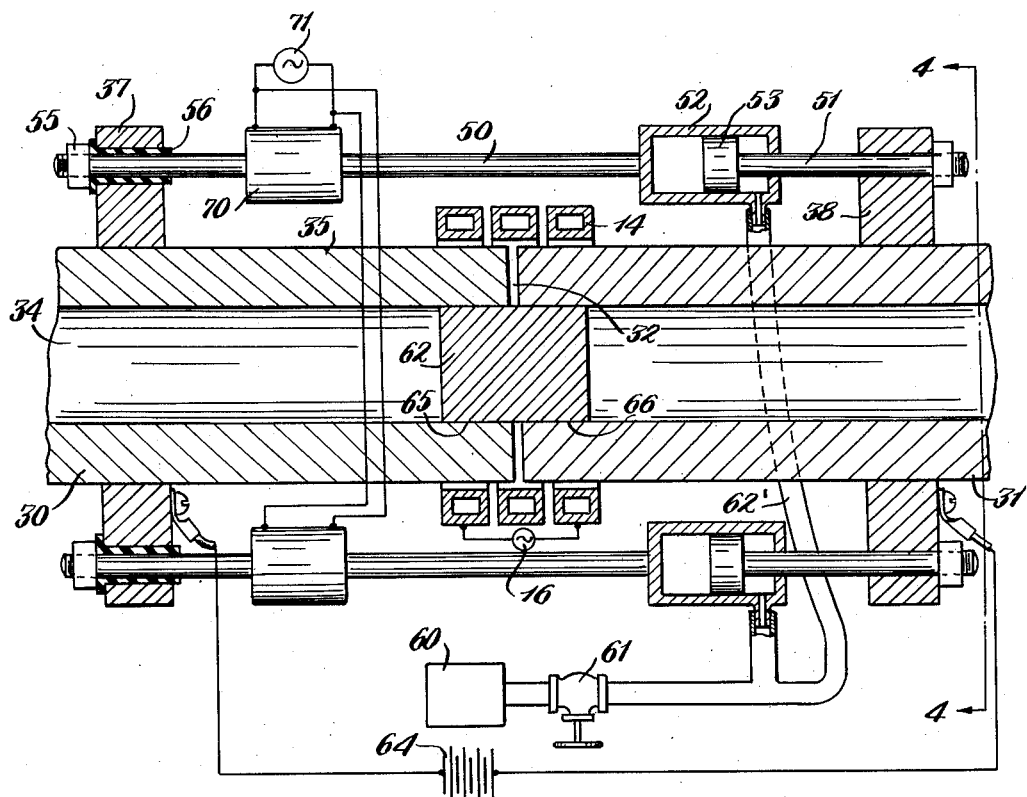
Figure 3 is a view similar to Figure 1 showing an alternative arrangement for heating the surfaces to be welded and, additionally, showing means for moving the surfaces into pressure-welding engagement.

Referring now to the drawings wherein preferred embodiments of the invention are shown more or less schematically, and like parts are indicated by like figures: Figure 1 shows a pair of metallic, electrically-conductive members 10, 11, each having a surface 12 to be welded. These surfaces are shown in abutting relationship and are preferably flat and parallel such as to provide a good electrical contact therebetween completely across the face and to exclude substantially all air from the joint. If necessary and in some instances, these surfaces may be ground and polished before being placed in abutting relationship. The members 10, 11 are shown for the purposes of illustration as being round bars and the invention will be described as though the metal is an SAE 1045 carbon steel. However, the members may be of any cross-sectional shape and may be of any electrically-conducting material having similar or more exaggerated resistivity-temperature curves.

The primary source of heat may be of any known means, such as flame, radiant or conduction-type heat. Preferably, high-frequency, electric induction-type heat is used. Thus, in this embodiment, an electrical coil forming an inductor 14 which may be comprised of one or more turns of a conducting material, such as copper, encircles the members 10, 11 in the proximity of the abutting surfaces. The inductor is preferably symmetrically placed with reference to the surfaces 12, although it will be appreciated that it may be offset axially for various reasons, such as one of the members adjacent the surfaces having a larger mass of metal or the like. The inductor 14 is shown connected to a source 16 of an alternating current, which source of alternating current is preferably of a high frequency. When high-frequency current is circulated through the inductor 14, electric currents are induced to flow in the members 10, 11 which, in the embodiment shown, would flow in a circumferential direction around the members 10, 11 parallel to the plane of the surfaces 12. Due to the nature of high-frequency induction heating, the currents would flow only adjacent to the outer surfaces of the members 10, 11, directly heating these surfaces only adjacent the outer edge thereof and producing a primary or direct heat-zone area 18 completely surrounding the members.

As is known, heat will flow from the heated area 18 to other portions of the members 10, 11 by conduction, the temperature gradually decreasing in proportion to the distance from the heated area. The temperature changes through the metal may be illustrated schematically and are indicated in Figure 1 by isothermal curves $t_1$, $t_2$ and $t_3$. These isothermal lines will shift as a function of time and are shown as illustrative only. In any event, the temperature of the members and, particularly, the surfaces at any point remote from the area 18, will be less than the temperature of the area 18 and in direct function to the distance.

If the members 10, 11 have a sufficiently large diameter, it is quite possible that the heated area 18 may reach the melting temperature, while the temperature along the isothermal line $t_3$ will actually be below the desired or necessary welding or fusion temperature. The heat flow longitudinally of the members is greater than the radial flow. It is apparent that any additional heating in the area 18 will, therefore, not obtain the desired result of increasing the temperature along the line $t_3$ at the surfaces 12 to the desired temperature.

The present invention contemplates means and method for raising the temperature of the surfaces 12 remote from the heated area 18 to a welding temperature. This is accomplished by making use of the variation in the resistivity of the metal due to the temperature variation across the surfaces 12.

Figure 2 shows the variation in electrical resistivity of the SAE 1045 steel in relation to the temperature of the metal and shows that as the temperature increases, the resistivity also continuously increases. Thus, it will be apparent that the resistivity of the metal through the area 18 will be greater than the resistivity of the metal along the isothermal line $t_1$, $t_2$ or $t_3$, and the resistivity of the metal along the isothermal line $t_1$ will be greater than the resistivity of the metal along the isothermal line $t_2$ and $t_3$, etc. Thus, the total electrical resistance between a point 20 on the member 10 and a point 21 on the member 11 to the flow of current therebetween or longitudinally of the members will vary dependent on the path over which the current flows and the integrated resistivity or resistance of the metal along this current path.

The current paths are shown schematically in Figure 1 as $i_1$, $i_2$ and $i_3$; the path $i_1$ through the heated area 18 having a total resistance $R_1$, the path $i_2$ intermediate to the axis of the members and the heated area having a resistance $R_2$ and the path $i_3$ along the axis of the members having a resistance $R_3$. As the resistivity of the metal along any one current path varies in accordance with the temperature of the metal, it will be obvious that the resistance $R_1$ will be greater than the resistance $R_2$ or $R_3$ and the resistance $R_2$ greater than the resistance $R_3$.

The present invention contemplates utilizing this variation in resistance to provide an increased heating action along the axis of the members 10, 11 to increase the temperature at the surfaces 12 most remote from the heated area 18 and thereby lower the temperature differential therebetween such that the temperature clear across the surfaces 12 may be uniformly raised to the welding or fusion temperature. A potential from an electric power source 22 is applied across the surfaces 12 by means of conductors 23 connected by suitable means to the members 10, 11 at a point remote from the surfaces 12. The source 22 may be either direct current or a low-frequency alternating current such that skin effect is not present and the currents will flow internally of the members 10, 11.

It will be noted that the resistances of the various current path $R_1$, $R_2$ and $R_3$ are in parallel. With parallel resistance circuits, the greatest amount of heating occurs in the circuit of lowest resistance.

Obviously, the resistivity of the members along any one of the current paths varies longitudinally with the actual temperature of the members. The temperature along any one path will be greatest at the surfaces 12 due to the nature of the heat flow. Thus, the greatest electrical resistivity will occur adjacent the abutting surfaces 12. These varying resistivities are in series. In a series circuit, the greatest heating occurs where the resistance is the highest. Therefore, along any given current path, the current from the source 22 will produce its greatest heating effect adjacent to the abutting surfaces 12.

As the resistance $R_3$ of the path $i_3$ is less than the other resistances, the greatest heating will occur along the axis or along the cooler portions of the members 10, 11 where the heat is most needed. Therefore, with the greatest heating in the current path $i_3$ and as the heating will occur adjacent the abutting surfaces 12, it will be obvious that the temperature at this inner point will be increased by the heat generated by current flowing from the source 22 to a greater extent than that through the path $i_1$ and $i_2$. The combination of the two heating actions will serve to increase the steepness of the isothermal lines resulting in isothermal lines $t'_1$, $t'_2$, and $t'_3$.

It will be appreciated that the heating due to the resistance-generated heat need not be large in order to bring the inner portions of the surfaces 12 up to the welding temperature. The inductor 14 supplies the major portion of the heating energy. The currents along the path $i_1$, $i_2$, and $i_3$ or the longitudinal currents merely serve to aid the inductor 12 and add a small amount of heat at the point where it is most needed and where the inductor is ineffective. With this method, it will be obvious that the size of the connectors for the resistance heating and the degree of the longitudinal currents can be held to a minimum. As the greatest currents will flow interiorly of the surfaces of the members 10, 11, the danger of detrimental effects of arcing or other difficulties will be substantially reduced, if not eliminated.

It will be appreciated that the surfaces 12 may be held in pressure engagement by any suitable means, which may or may not be adjustable. Remotely-controllable means may be employed such as that shown in the modified embodiment of Figure 3 which will be described hereinafter.

The amount of current flowing from the source 22 may be varied to effect the required amount of heating and may be allowed to flow only for a portion of the total heating time preferably at the end thereof.

In some instances, improved welds may be obtained by reciprocating or twisting the members slightly relative to each other as the surfaces reach the plastic state, such that the molecules of the metal in the two members can more thoroughly intermingle. The members may also be moved transversely relative to their axes with like results. The reciprocation may occur at any frequency, but preferably at some relatively high frequency so that an extremely rapid vibration of the molecules is obtained. With the higher frequencies, the actual movement of the members in either direction is, of course, hardly measurable. The vibration may be applied to the members either through the clamping device or by direct contact of a vibrator to the sides or ends of the members.

The surfaces 12 before abutment may be coated with metals such as lead, copper, nickel or chromium or very thin sheets of this substance may be placed between the abutting members. At the final elevated temperatures, the molecules of these metals will migrate into the surfaces 12 and not affect the final strength of the weld. On the other hand, they will help to provide a uniform electrical contact over the entire surfaces 12.

Referring now to Figure 3, a pair of members 30, 31 are shown each having a surface 32 to be heated to the welding temperature and brought into pressure-welding engagement. In this embodiment of the invention, the members are preferably of a cylindrical or tubular shape and have a central longitudinal opening 34; and, in view of the improvements offered by this invention, may have a relatively thick side wall 35. The surfaces 32 are preferably flat and parallel and, during the heating operation, are in slightly-spaced relationship.

The members 30, 31 are supported in axial alignment and clamping rings 37, 38 encircle the outer surfaces of the members 30, 31 respectively. These clamping rings may be of any conventional construction, their purpose being in this embodiment to provide an electrical contact to the members 30, 31 and a mechanical contact between the members such that the surfaces 32 can be drawn into pressure engagement to any desired degree when the surfaces 32 have been raised to the desired temperature. The clamps 37 and 38 may be identical in construction. Clamp 38 is shown in greater detail in Figure 4. It comprises a pair of semicircular members 40, 41, each having a concave inner surface with a radius approximately equal to the radius of the outer surface of the member 31. The semicircular members 40, 41 preferably have a total length slightly less than the outer circumference of the member 31 such that when assembled as shown around the member 31, a small gap 43 exists between the ends. Screws 44 and 45, extending through one of the members and threading into the other, are provided for drawing the members 40, 41 toward each other and into firm clamping engagement with the outer surface of the member 31.

A hydraulic mechanism is provided for drawing these clamps 37, 38 toward each other and, thus, bringing the surfaces 32 into pressure engagement. This hydraulic arrangement may comprise a number of spaced, aligned tie rods 50 and 51 interconnected by means of a hydraulic cylinder 52 fastened to the right end of the tie rod 50, and a piston 53 in the cylinder fastened to the left end of the tie rod 51. The right end of the tie rod 51 extends through an opening in the clamp 38, and a nut thereon transfers the thrust from the hydraulic piston to the clamp 38. The left end of the tie rod 50 extends through an opening on the clamp 37 and a nut 55 thereon transmits the thrust of the hydraulic mechanism to the clamp 37. The left end of the tie rod 50 is insulated from the clamp 37 by an insulating sleeve 56 for reasons which will hereinafter appear. The hydraulic mechanism is operated by admitting hydraulic fluid under pressure from a source 60 and controlled by a valve 61 through a hydraulic conduit 62' to the cylinder 52.

In the embodiment of the invention shown, two such hydraulic mechanisms are illustrated. More or less can be used or other types of power means may be provided for moving the surfaces 32 into pressure-welding engagement. The clamps 37 and 38 may be of any desired material, but are preferably of copper and may have their inner surfaces roughened or otherwise or silver plated to provide a good electrical contact to the members 30, 31 when in assembled position.

An inductor 14 similar to that shown in Figure 1 is illustrated in heating position in proximity to the surfaces 32 and connected to a source 16 of high-frequency currents. The electric heating currents induced to the members 30, 31 by the member 14 flow to the exterior surfaces of these members. Thus, heat, in order to reach the interior portions of the surfaces 32, must flow thereto by conduction. A similar situation exists as explained with reference to the embodiment shown in Figure 1 and heating the inner areas of the surfaces becomes difficult.

This embodiment of the invention contemplates a method and apparatus for supplying additional heat interiorly of the members 30, 31 to aid in bringing the inner area of the surfaces up to the welding temperature. Again, electrical resistance-type heat is used. In the embodiment shown, an electrically-conductive plug 62 having an external diameter substantially equal to or greater than the diameter of the passage 34 is provided which extends into the end of both passages and provides an electrical circuit between the members. Preferably, the plug 62 has a force fit into the passage 34.

A power source 64 of either direct or low-frequency alternating current has its terminals connected respectively to the clamps 37, 38, the electrical circuit for this power source being completed from the clamp 37 to the member 30, through the contacting surfaces 65 between the member 30 and the plug 62, through the plug 63, through the contacting surfaces 66 between to the member 31, through the member 31 and thence through the clamp 38 back to the power source 64. It will be appreciated in examining this circuit that the principal point of high resistance will be at the surfaces 65, 66 due to the heating of the metal by the inductor 14 and due to the contact resistance. Thus, a resistance heating will occur on these surfaces which, in effect, is a second source of heating interiorly of the members 30, 31 whereby heat may flow radially outwardly from this heated portion and radially inwardly from the heated area 18 resulting from the inductor 14. When the surfaces have reached the desired temperature, the currents from the source 64 are turned off, the valve 61 is opened actuating the hydraulic mechanism and moving the surfaces 32 into firm pressure engagement where they are held until the weld is completed.

In this operation, the members slip or slide over the surfaces of the plug 62 and the plug may be left in position or removed as desired.

The plug 62 may be of any desired material, the principal attribute necessary being that it is capable of withstanding the high temperatures involved in welding. Carbon or graphite is preferred. However, other materials may be employed such as steel of the same material being welded. In some cases, it has been found desirable to provide a plug having a greater coefficient of expansion than the material of the members 30, 31 such that when the various members pecome heated, the plug expands to a greater degree than the members 30, 31 and a firm pressure and electrical contact is always maintained therebetween. If the plug is of a high-resistance material such as carbon or graphite, which in itself may be heated by the passage of current to very high temperatures, it will also be heated internally by the flow of electric current from the source 64 and this heat will flow by conduction from the plug to the surface of the passage 34 and thence heat the surface 32.

As is described in the copending application of Alfred C. Body, Serial No. 146,887 filed February 28, 1950, high-frequency currents may be used in place of the low-frequency or direct currents, the result being a general heating only of the opposed surfaces at the surfaces.

It will be appreciated that it is preferred to complete the welding action with the temperature of the surfaces 32 over their entire area being below the melting temperature. In this state, some difficulty may be encountered in having the molecules of the one surface intermingle with and become entirely homogeneous. An improved weld may be obtained if the surfaces are vibrated or oscillated rapidly relative to each other, or if the pressure is increased or decreased at an extremely rapid rate. In the embodiment of the invention shown in Figure 3, means for slightly oscillating the plastic surfaces 32 when in engagement are provided. One form that these means may take is illustrated as a vibrator 70 powered from a suitable source 71 of the high-frequency electrical energy. The vibrator 70 may be of the conventional magnetostriction type which has been found capable of transducing large amounts of high-frequency electrical energy into high-frequency mechanical energy. As the surfaces 32 are raised to the welding temperature and brought into pressure engagement by the hydraulic mechanism shown, electric power of the frequency of the order of 30,000 to 40,000 cycles is applied to the vibrator 70, which will vibrate the members 30, 31 and the surfaces 32 at an extremely high rate, thus, further agitating the highly heated molecules at the surfaces and facilitating their intermingling and producing a near perfect weld.

Figure 5:
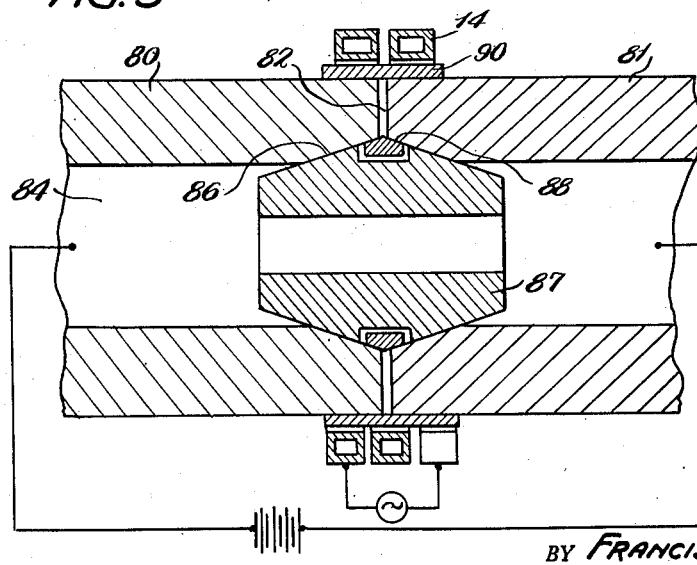
Figure 5 is a view similar to Figure 1, but showing a further modified arrangement of parts embodying the present invention.

Referring now to the embodiment of the invention shown in Figure 5, a pair of members 80, 81 are shown each having a surface 82 disposed in a position to be butt welded. The members 80, 81 are similar to the members 30, 31 shown in Figure 3 and each have a longitudinal interior passage 84. In this embodiment, the ends of each passage 84 are machined or formed to have an outwardly-tapering, conical portion 86, which portions are preferably identical and, as shown, are oppositely facing. A block or plug 87 having frustro-conical ends complementary to the conical portion 86 extends axially into the ends of passages 84. The diameter of the block is such as to slightly space the surfaces 82 when the members are assembled in the heating position. The outer tapered surfaces of the carbon block 87 are in pressure and electrical-resistance contact with the inner tapered surfaces 86 of the passage 84 in a similar manner to that described with reference to the embodiment shown in Figure 3.

Suitable clamping means not shown may be provided for moving the members 80, 81 toward each other. With the arrangement shown, by providing a slight initial pressure, the amount of resistance between the interior surfaces of the members 80, 81 with the outer surfaces of the carbon block may be easily regulated and, therefore, the surface resistance between the members may be readily controlled. The heating operation of the embodiment shown in Figure 5 is much similar to that shown in Figure 3. It will not be further detailed. In this arrangement, however, when the surfaces 82 have reached the welding temperature, it will be appreciated that they must be brought into pressure-welding engagement. Normally, the tapered surfaces of the carbon block 87 would prevent this. This embodiment of the invention, however, contemplates that the carbon block 87 will be broken or collapsed by the longitudinal pressure on the members 80, 81 by the clamping apparatus, thus permitting the surfaces 82 to be brought into pressure engagement. Obviously, when the carbon block 87 is ruptured, the possibility exists that pieces thereof will become lodged between the surfaces 82. A shield ring 88 is provided in a recess in the surface of the carbon block at the junction of the conical surfaces which, when the surfaces 82 are being heated, is disposed in the plane of the surfaces and extends on either side thereof. This ring 88 is preferably of a metallic material and may be split, as shown more clearly in Figure 6, along a tapered line as at 89 so that when the members 80, 81 are moved to pressure engagement, the ring may be wedged radially inwardly and readily collapse a sufficient amount so as not to interfere with the movement of the members. Thus, it will be seen that the ring 88 prevents the carbon particles from entering the space between the surfaces 82 when it is ruptured but, at the same time, does not prevent free longitudinal movement of the members 80, 81 toward each other at the desired time.

In order that the oxygen of the air does not enter the space between the surfaces 32 or 82 during the heating interval and oxidize the surfaces and in order to prevent any foreign substances from entering into the space during the heating operation, a sleeve 90 shown in Figure 5 may be provided about the members to extend on either side of the surfaces 32 or 82. This sleeve preferably fits the outer surfaces of the members relatively firmly and is preferably of a ceramic and electrically nonconducting material so as not to interfere with the heating operation of the inductor 14. The sleeve 90 may be destroyed when the welding operation is completed.

If desired, the electric currents may also be connected directly to the center plug and allowed to flow outwardly to each member.

It is obvious that I have provided an improved method and apparatus for the butt welding of large-area surfaces which accomplishes the objectives of the invention heretofore set forth.

Preferred embodiments only of the invention have been described together with the principles which, to the best of my knowledge, govern the success of my invention.

Modifications and alterations will occur to others upon a reading and understanding of this specification and it is to be understood that it is my intention that such modifications and alterations will come under the present invention as defined and within the scope of the claims.

Having thus described my invention, I claim:

1. A method of heating large-area surfaces of members prior to butt welding comprising bringing said surfaces into pressure engagement, applying heat externally of said members in the vicinity of said surfaces to heat said surfaces by conduction in progressively lessening amounts from the outer periphery thereof toward the center and flowing electric currents between said surfaces to produce a heating effect primarily remote from the external source of heat.

2. A method of heating large-area surfaces of large metallic members prior to butt welding comprising bringing said surfaces into pressure engagement, heating said members externally in the vicinity of said surfaces to heat said surfaces by conduction, the temperature across the surfaces decreasing progressively toward the center thereof whereby to effect a varying electrical resistivity across said surfaces and longitudinally of said members, and flowing electric currents between said surfaces to effect a heating action primarily remote from the external surfaces of said members.

3. The method of heating large-area surfaces of members preparatory to butt welding comprising inducing high-frequency currents to flow in the periphery of said surfaces and simultaneously flowing low-frequency electric currents between said surfaces.

4. The method of heating large-area surfaces of a pair of members preparatory to butt welding comprising inducing high-frequency electric currents to flow in said members adjacent said surfaces and in a plane generally parallel to the surfaces, the currents being concentrated in the external periphery of said surfaces because of the skin effect of high-frequency current flow whereby to heat the exterior portions of said members in the vicinity of said surfaces and effecting decreasing electrical resistivity toward the center of said surfaces, and flowing low-frequency electric currents between said surfaces to be welded to effect a secondary heating primarily of the center of said surfaces and in progressively decreasing amounts outwardly therefrom.

5. The method of heating large-area surfaces of members preparatory to butt welding same comprising providing said surfaces with an aperture, positioning said surfaces in a slightly-spaced, opposed relationship, providing a high-resistance plug extending into each of said apertures, inducing high-frequency currents to flow peripherally of said surfaces to directly heat the periphery thereof and the portions of said surfaces remote from the periphery by conduction, the temperature of such surfaces normally tending to decrease progressively toward the center thereof and flowing an electric current through said members and said plug to heat the plug to high temperatures and thereby provide an additional source of heat which heats the inner periphery of the surfaces by conduction and enables a uniform temperature to be obtained across the surfaces.

6. A plug adapted to extend into apertures in a pair of surfaces to be heated and butt welded, said plug having a diameter substantially equal to the diameter of said apertures and having a coefficient of expansion greater than the coefficient of expansion of the members to be heated.

7. A plug adapted to extend into apertures in a pair of slightly-spaced surfaces to be welded, said plug having a pair of outwardly tapering, frusto-conical surfaces, the juncture of the conical surfaces being grooved and a split, nonfrangible ring having a width slightly greater than the desired width between said surfaces disposed in the groove, said ring having outer surfaces forming a continuation of the conical surfaces.

8. The method of heating large-area surfaces of a pair of members preparatory to butt welding same comprising providing outwardly-tapering apertures centrally in said surfaces, inserting a plug having correspondingly-shaped surfaces in said apertures, the dimensions of said plug being such as to slightly space said surfaces, inductively heating exterior portions of said members in the vicinity of said surfaces whereby to effect a progressively decreasing temperature toward said plug and simultaneously passing electric currents longitudinally through said member and said plug to effect a heating of the latter to provide a secondary heat source at the center of said surfaces to heat said surfaces from the inner periphery outwardly.

9. The method of claim 7 wherein the plug is of a frangible material and the surfaces are forcibly brought into pressure engagement after said plug is ruptured by the forces bringing said surfaces into engagement.

References Cited in the file of this patent

UNITED STATES PATENTS

| Number | Name | Date |
|---|---|---|
| 385,384 | Thomson | July 3, 1888 |
| 843,515 | Bier | Feb. 5, 1907 |
| 1,022,712 | Thomson | Apr. 9, 1912 |
| 1,270,860 | Newcomb | July 2, 1918 |
| 1,959,791 | Kautz | May 22, 1934 |
| 2,014,082 | Fox | Sept. 10, 1935 |
| 2,187,529 | Bates | Jan. 16, 1940 |
| 2,205,425 | Leonard | June 25, 1940 |
| 2,222,906 | Hentzen | Nov. 26, 1940 |
| 2,241,216 | Phelps | May 6, 1941 |
| 2,416,488 | Mathey | Feb. 25, 1947 |